US 7,703,033 B2

(12) United States Patent
Buchholz

(10) Patent No.: US 7,703,033 B2
(45) Date of Patent: Apr. 20, 2010

(54) ACCESS ADMINISTRATION USING ACTIVATABLE RULES

(75) Inventor: Cristina Buchholz, Rellingen (DE)

(73) Assignee: SAP AG, Walldorf (DE)

( * ) Notice: Subject to any disclaimer, the term of this patent is extended or adjusted under 35 U.S.C. 154(b) by 1006 days.

(21) Appl. No.: 11/142,746

(22) Filed: Jun. 1, 2005

(65) Prior Publication Data
US 2006/0277593 A1 Dec. 7, 2006

(51) Int. Cl.
G06F 3/048 (2006.01)
G06F 21/00 (2006.01)

(52) U.S. Cl. .................. 715/771; 715/700; 715/781; 726/2; 726/28

(58) Field of Classification Search .............. 726/2, 726/26–28; 715/700, 748, 764, 771, 781
See application file for complete search history.

(56) References Cited

U.S. PATENT DOCUMENTS

| | | | | | |
|---|---|---|---|---|---|
| 5,892,900 | A | * | 4/1999 | Ginter et al. ................ | 726/26 |
| 6,088,679 | A | * | 7/2000 | Barkley ..................... | 705/8 |
| 6,308,288 | B1 | * | 10/2001 | Chang et al. ................ | 714/38 |
| 2001/0027434 | A1 | * | 10/2001 | Alaia et al. ................ | 705/37 |
| 2002/0078432 | A1 | * | 6/2002 | Charisius et al. ........... | 717/102 |
| 2003/0093672 | A1 | * | 5/2003 | Cichowlas ................. | 713/168 |
| 2003/0120601 | A1 | * | 6/2003 | Ouye et al. ................ | 705/51 |

OTHER PUBLICATIONS

'Sun's XACML Implementation' [online]. Sun Microsystems, Inc., 2003-2004, [retrieved on Jun. 1, 2005]. Retrieved from the Internet: <URL: http://sunxacml.sourceforge.net>.

Structural Authorization Maintenance [online]. SAP, [retrieved on Apr. 12, 2005]. Retrieved from the Internet: <URL: http://help.sap.com/saphelp_erp2004/helpdata/en/ff/8ae287ba3949a0b6c9def6c43fcel3/co...>.

Structural Authorization [online]. SAP, [retrieved on Apr. 12, 2005]. Retrieved from the Internet: <URL: http://help.sap.com/saphelp_erp2004/helpdata/en/94/f52707eeee456284618cc8f01bbde4/c...>.

Creating Authorization Roles [online]. SAP, [retrieved on Apr. 12, 2005]. Retrieved from the Internet: <URL: http://help.sap.com/saphelp_erp2004/helpdata/en/cl/db3fc2fd3111d5997a00508b6b8b11/c...>.

Authorizations for Human Resources [online]. SAP, [retrieved on Mar. 14, 2005]. Retrieved from the Internet: <URL: http://help.sap.com/saphelp_erp2004/helpdata/en/97/27973b3ea3eb0fe10000000a114084/c...>.

* cited by examiner

*Primary Examiner*—Nasser Moazzami
*Assistant Examiner*—Travis Pogmore
(74) *Attorney, Agent, or Firm*—Buckley, Maschoff & Walwalkar LLC

(57) ABSTRACT

Access to information instances is administered using selectively activatable rules. A computer program product includes rules establishing authorizations to information instances in a computer system, each of the rules authorizing a predefined subject to perform a predefined action on a predefined object. The computer program product includes an activation function for an administrator to selectively activate at least one of the rules, the activated rule to be applied upon a user seeking to perform an action on any of the information instances.

16 Claims, 3 Drawing Sheets

Maintain Role

■ Select the workcenters for the role

Role Sales Manager

Available Workcenters

| | Role |
|---|---|
| ▷ | Sales Professional |
| | ☐ Accounts |
| | ☐ Activities |
| | ☐ Products |
| | ☐ Marketing |
| | ☐ Acquisition |
| | ☐ Planning |
| | ☐ Sales Management |
| ▷ | Service Professional |
| ▷ | Customer |

Add ▷
◁ Remove

Save  Cancel

Selected

| | | Workcenters |
|---|---|---|
| ☐ | ▷ | Accounts |
| ☐ | ▷ | Activities |
| ☐ | ▷ | Products |
| ☐ | ▷ | Aquisition |

| | Active | Rules | Attributes |
|---|---|---|---|
| 118A | ☐ ▮ | Full access | |
| 118B | ☐ ◐ | Show only opp. with status "leads" for a sales area | deactivated |
| 118C | ☐ ○ | Sales team can access the sales documents | activated |
| 118D | ☐ ○ | Sales documents of my team | |
| 118E | ☐ ○ | Show only opportunities for a sales area | activated |

Activate  Deactivate

| | | |
|---|---|---|
| ☐ | ▷ | Planning |
| ☐ | ▷ | Sales Management |

| | Active | Rules | Attributes |
|---|---|---|---|
| 118A | ☐ ▮ | Full access | |
| 118F | ☐ ○ | Show my team's incentives and commions | |
| 118G | ☐ ▮ | Show only actual/plan data for characteristics I'm responsible for | deactivated |
| 118H | ☐ ○ | Show my team's performance indicator | |
| 118I | ☐ ▮ | Cost information only displayed for Manager | activated |
| 118J | ☐ ▮ | Show only my incentives and commissions | |

Activate  Deactivate

FIG. 1

ACCESS ADMINISTRATION USING ACTIVATABLE RULES

TECHNICAL FIELD

The description relates to administrating access to information instances using rules that can be selectively activated.

BACKGROUND

The working environment of e-business is characterized by open networks and cross-company business transactions, replacing closed and monolithic systems. In this environment, secure data access is a central aspect of doing business. As a result, access to digital information is typically managed using one or more authorizations. Also, in the world of Web services, access will depend more and more on authorization. In this environment, ways of rationalizing the authorization process and authorization status will be key.

Some existing systems manage authorizations by assigning information instances (such as a document) to an actor in the system (such as a user). This approach is used in role-based access management systems. As another example, some existing systems assign particular actors to individual instances. This approach is implemented in the "access control lists" used in products from Microsoft Corp.

SUMMARY

The invention relates to administering access using rules that can be activated.

In a first general aspect, a computer program product to be used in administrating user access to information instances is tangibly embodied in an information carrier and comprises rules establishing authorizations to information instances in a computer system. Each of the rules authorizes a predefined subject to perform a predefined action on a predefined object. The computer program product further comprises an activation function for an administrator to selectively activate at least one of the rules, the activated rule to be applied upon a user seeking to perform an action on any of the information instances.

In selected embodiments, the activation function is displayed in a graphical user interface generated by the computer program product. The rules may be grouped in at least one work center software module that can be assigned to one or more users. The work center software module may be proposed for assignment to the one or more users based on a role of the one or more users. The work center software may provide general authorization to perform a plurality of predefined actions. The rules may be configured to limit the general authorization provided by the work center software module. If the predefined subject associated with the activated rule is not specified in the computer system, the activated rule may not limit the general authorization to perform the predefined action associated with the activated rule. The predefined object in at least one of the rules may be a document and the at least one rule may take into account a status of the document. The computer program product may be included in the computer system upon delivery to a customer, and the predefined subjects may be specified by the customer.

In a second general aspect, a graphical user interface (GUI) for administrating user access to information instances comprises first items representing rules that establish authorizations to information instances in a computer system. Each of the rules authorizes a predefined subject to perform a predefined action on a predefined object. The GUI provides that an administrator can select any of the items to activate the corresponding rule. The activated rule is to be applied upon a user seeking to perform an action on any of the information instances.

In selected embodiments, the first items are grouped in association with a second item that represents a work center software module that can be assigned to one or more users. The administrator may activate the at least one of the rules to limit a general authorization provided by the work center software module. The GUI may provide status information indicating whether the predefined subject associated with the activated rule has been specified in the computer system. The computer program product may be included in the computer system upon delivery to a customer.

In a third general aspect, a graphical user interface (GUI) for administrating user access to information instances comprises work center items that are proposed to be assigned to a user in a computer system. Each of the work center items represents a work center software module that provides general authorization for the user to perform at least one predefined action. The GUI provides that any of the work center items can be selected for assignment to the user. The further comprises at least one rule item associated with each of the several work center items. Each rule item represents a rule that is configured to limit the general authorization provided by the work center software module. The GUI provides that the at least one rule item can be selected to activate the rule. The activated rule is be applied upon a user seeking to perform an action on any of the instances.

Advantages of the systems and techniques described herein may include any or all of the following: Providing flexible access management in which an administrator can select any of several rules to administer authorizations to information. Providing a GUI that allows flexible selection of a rule to be applied when a user seeks access to information. Providing access management where a granted general authorization to perform a predefined function can be flexibly restricted using one or more rules.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1 shows a graphical user interface used for managing authorizations to information instances.

Like reference numerals in the various drawings indicate like elements.

DETAILED DESCRIPTION

Figure 2:
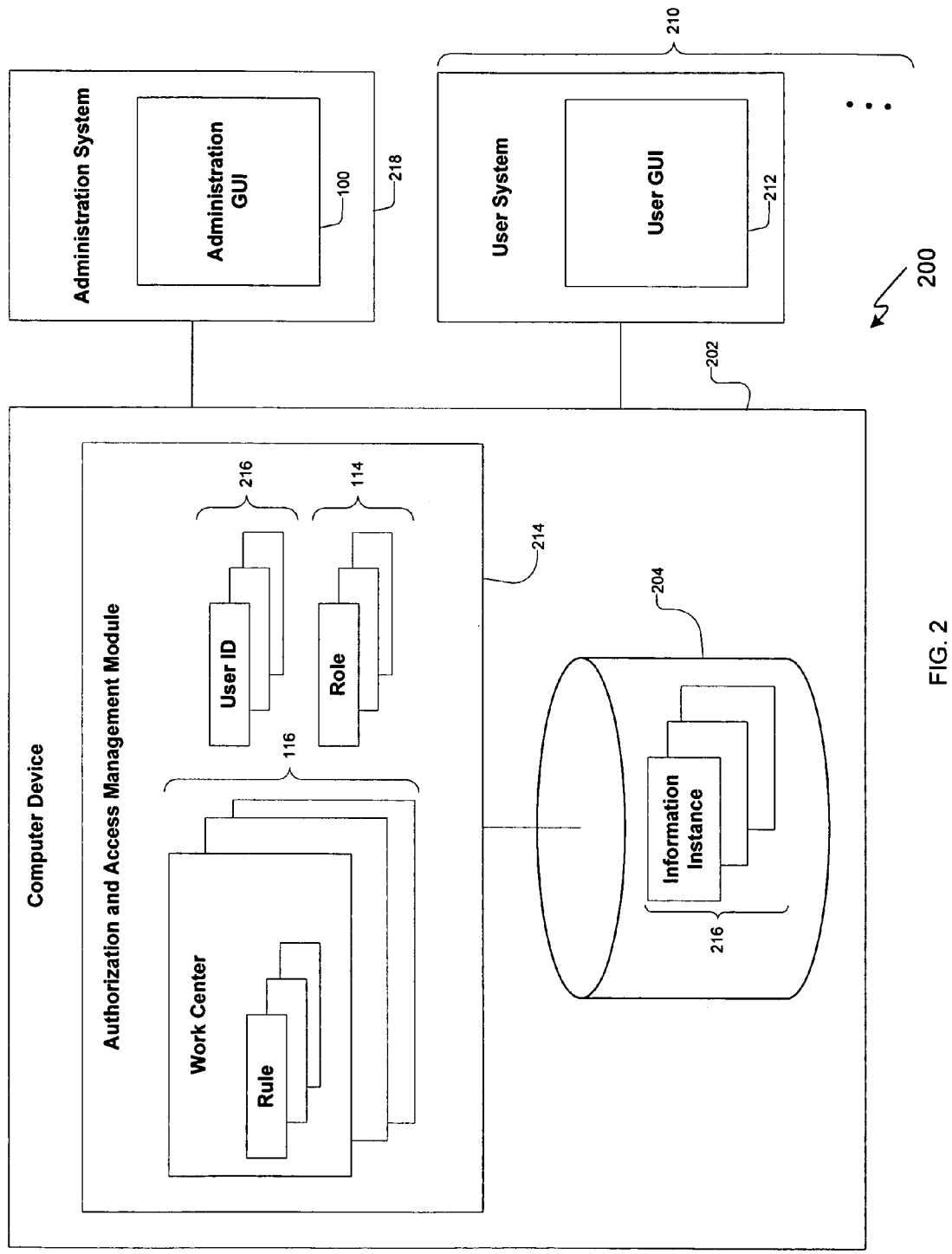
FIG. 2 is a block diagram of a computer system that can generate the FIG. 1 graphical user interface.

FIG. 1 shows an administration graphical user interface (GUI) 100 that can be used for administrating the rights of one or more users to access information in a computer system. Particularly, the GUI 100 provides that an administrator can selectively activate rules establishing authorization to information instances. This lets the administrator control the rule(s) to be applied when a user seeks access.

A "maintain role" view 102 is currently being displayed in the GUI 100. The view 102 allows a person, such as a someone recognized as an administrator in the system, to review, create or change the settings that determine the authorizations to be associated with a specific role in the system. Currently it is a "Sales Manager" role that is being maintained, as indicated by a role field 104. That is, the GUI 100 currently focuses on the authorization(s) to be granted to those users that have the role of sales manager. The view 102 can be used for maintaining any role recognized in the system.

In an area 106, the GUI 100 lets the administrator select one or more work centers to be assigned with the user. In this example, any selected work center will be assigned with the sales manager users through the corresponding role. Each of the work centers is a software module that groups together functionality having a common business meaning. Generally, the work centers define the actions that can be performed on information in the system. The work centers carry the functional aspects of access management, meaning the definition(s) of what actions, if any, can be performed on any instance of the reachable information. When a work center is assigned to a user (for example through a role), this confers on that user the general authorization to perform each and every one of the actions available in the work center. The work centers available in the area 106 are proposed for assignment based on the role being maintained. Selected work centers can be assigned to, and removed from, the current role using controls 108, and the presently selected work centers appear in an area 110.

In this example, the available work centers listed in the area 106 are associated with other roles in the system, as indicated by a role heading 112. Particularly, the area 106 lists three roles from which work centers can be selected for the sales manager role: a sales professional role 114A, a service professional role 114B and a customer role 114C. Each of the roles 114A-C (collectively: roles 114) is associated with one or more work centers 116. Currently, the area 106 shows only the work centers for the sales professional role: an accounts work center 116A, an activities work center 116B, a products work center 116C, a marketing work center 116D, an acquisition work center 116E, a planning work center 116F and a sales management work center 116G. In this example, the area 110 indicates that all of the work centers 116 except the marketing work center 116D have been selected for the sales manager role.

Each of the work centers provides general authorization to perform its associated actions on the reachable information. To name just two examples, the accounts work center 116A defines the actions that can be performed on reachable information relating to accounts, and the products work center 116C defines the actions that can be performed on reachable information relating to products. The specific information that can be reached through any of the work centers may be different from that of any other work center.

It is sometimes useful to restrict or limit the general authorization for individual users. That is, the same work center may be assigned to two users, but only portions of the reachable information may apply to each of them. For example, a sales manager in Germany should have access to German sales documents but not to French sales documents, and vice versa for a French sales manager. Such limitations can be created using one or more rules 118.

The GUI 100 shows rule items under each of the work centers 116E and 116G. The rule items represent the corresponding rules 118. The GUI 100 lets the administrator selectively activate any of the rules. For clarity, the following description does not explicitly make the distinction between the specific rule and its corresponding selectable rule item displayed in the GUI.

The acquisition work center 116E includes rules 118A-E and the sales management work center 116G includes rules 118A and 118F-J. A "full access" rule 118A, that is here also included under the work center 116G, may be a default rule for any work center where no other rule is explicitly activated. Because the work center provides general authorization to perform its corresponding predefined action(s), the full access rule 118A means that this general authorization is not limited or restricted on an instance basis. No rules are currently displayed for the remaining work centers in the area 110.

A status column 120 for each of the work centers indicates whether each of the specific rules is activated or non-activated. A "non-active" icon 122 indicates that the corresponding rule is currently not active, meaning that it is not currently selected by an administrator to be applied when a user seeks access to information. An "active" icon 124 indicates that the corresponding rule is currently active, meaning that it is currently selected by an administrator to be applied when a user seeks access to information. A "special case active" icon 124 will be discussed below.

The following exemplary rules are shown in the area 110. Under the work center 116E, the rule 118B is labeled "Show only opp. with status 'leads' for a sales area". This rule relates to opportunity documents in the computer system, some of which have the status "leads," meaning that they represent leads to potential business transactions. The word "show" in the rule indicates that the rule relates only to inspection of the related documents, as opposed to creation or modification, for example. The "sales area" can be a geographical, organizational or freely defined limitation. Accordingly, if the rule 118B is applied upon a user assigned to the work center 116E seeking access to an opportunity document, the rule will restrict the general authorization provided by the work center to only those opportunities that are leads and that pertain to the specified sales area. Next, the rule 118C indicates that access to "sales documents" is restricted to a "sales team". In contrast, the term "access" may include operations such as creating, editing and deleting in addition to the right of reviewing the information instance(s). The rule 118D restricts the authorization to sales document of "my team," meaning the team (defined in the computer system) of which the user is a member. The rule 118E restricts the authorization to opportunities for a sales area.

Under the work center 116G, the rule 118F restricts the authorization to "incentives and commissions" owned by the user's "team". The rule 118G restricts the authorization to "actual/plan data" relating to "characteristics" for which the user is responsible. The rule 118H restricts the authorization to "performance indicators" for the user's team. The rule 118I restricts the authorization to "cost information" that is "displayed" for the manager. The rule 118J restricts the authorization to "incentives and commissions" owned by the user.

The administrator can activate any selected rule(s) using an activation control 128 or deactivate any selected rule(s) using a deactivation control 130. The corresponding icon will then be displayed in the column 120. Here, rules 118B, 118C, 118D, 118E, 118F and 118H have currently been activated, as indicated by the respective "active" (124) and "special case active" (126) icons associated therewith. In contrast, rules 118A, 118G, 118I and 118J are not currently activated, as indicated by the "non-active" icons 122. The non-active rules will not be applied unless and until they are activated. Thus, the non-activated rules exist in the system but they do not limit the general authority provided by their respective work centers.

Selectively activatable rules can be included in the computer system when it is delivered from the manufacturer to the customer. Such features are sometimes referred to as business content, because they are intended to substitute for, or complement, business-specific contents and programming by the customer. Accordingly, the rules 118 may be included in the system 200 (or in any component thereof, such as the computer device 202 or the AAMM 214), upon delivery to the customer. One advantage of this approach is that the customer's administrator can conveniently manage the authorizations to information instances by selectively activating the relevant rules. As noted above, the system may require the customer to input its own attributes to be used in managing the authorizations. However, using the "special case active" status indicator the rules can be activated also before this time.

Generally, applying any of the rules establishes that there is authorization for a predefined subject (such as the current user) to perform a predefined action (such as viewing) a predefined object (such as a sales document). If the rule is met, the sought access will be granted. With the "full access" rule 118A these categories are all unrestricted, meaning that the predefined subject includes every user assigned to the work center; the predefined action includes any action covered by the work center, and the predefined objects include any information reachable through the work center. In other rules, one or more of the categories can be further restricted, such as in the exemplary rules described above.

Application of some rules involves evaluating attributes in any of the predefined subjects, predefined actions or predefined objects. If the rule is met by the evaluated attribute(s), the sought access is allowed. If not, the rule does not authorize the sought access. Particularly when rules are pre-delivered with the system, the administrator at the customer's site may not yet have defined the relevant attributes in the system. This primarily applies to user attributes; object attributes are often intrinsic to the resource (information instance) itself.

The GUI 100 provides that rules can be activated although their respective attributes may not yet be available. Because of the missing attribute(s), the rule cannot (yet) be evaluated. The rule is therefore provided with the "special case active" icon 126 which means that the administrator has flagged this rule as one that should be applied once its necessary attributes become available. In the meantime, the rule does not limit the general authorization provided by the work center. The status of the attribute(s) is reflected in an attribute status column 132. Here, a "deactivated" entry 134 indicates missing attribute(s); an "activated" entry 136 indicates presence of the relevant attribute(s). The attribute status column may be blank for rules that are evaluated without attribute information for the predefined subject(s), such as the identities of "my team" (see rules 118D, 118F and 118H) or the user's identity (see rule 118J).

The GUI 100 can be generated in a computer system 200 shown in FIG. 2. The system 200 may include a computer device 202 in which a repository 204 holds one or more information instances 206. Users may seek access to the computer device 202, and in particular to the information instance(s) 206, through one or more user systems 210 connected to the computer device 202 through any kind of network. If access is granted, the sought information instance(s) may be presented in a user GUI 212 on the user system(s).

The computer device 202 includes an authorization and access management module (AAMM) that is connected to the repository 204. Upon the user seeking access, the AAMM decides whether access should be granted or denied. One or more of the rules 118 may establish the authorization for a predefined subject to perform a predefined action on the information instances. As discussed above, one or more work center software modules 116 may provide the general authorization to perform the predefined action(s), and this authorization may be limited by the rule(s) 118. The predefined subjects may be defined as one or more of user IDs 216 defined in the system 200. In some implementations, the user IDs are associated with respective roles 114 which can be used in managing authorizations.

Exemplary uses of the system 200 include 1) an administrator managing authorizations by selectively activating one or more of the rules, and 2) a user seeking access to a specific information instance. In the former situation, the administration GUI 100 can be displayed to the administrator in an administration system 218 connected to the computer device 202 through any kind of network. Among other tasks, the administrator can: maintain the "sales manager" role; review work centers that are proposed for assignment to the maintained role; select any or all of the proposed work centers; review rules associated with the selected work center(s); and selectively activate or deactivate any of the rules.

When a user seeks access, the AAMM 214 determines whether the user has authorization for the sought access. Assume that the user seeks access to a sales contract in the repository 204. This access is sought through the acquisition work module 116E which grants general authorization to sales documents among other information instances. The rule 118B does not further restrict this general authorization because there is attribute(s) missing according to the entry 134 in the attribute status column 132. The rule 118C, in contrast, has the "active" icon 124 and the "activated" entry 136 in the status column. Moreover, the sought sales contract is covered by "sales documents" to which the rule 118C refers. Also, in this example the AAMM 214 determines that the user seeking access is a member of the "sales team" covered by the rule, so the sought access will be granted.

Figure 3:
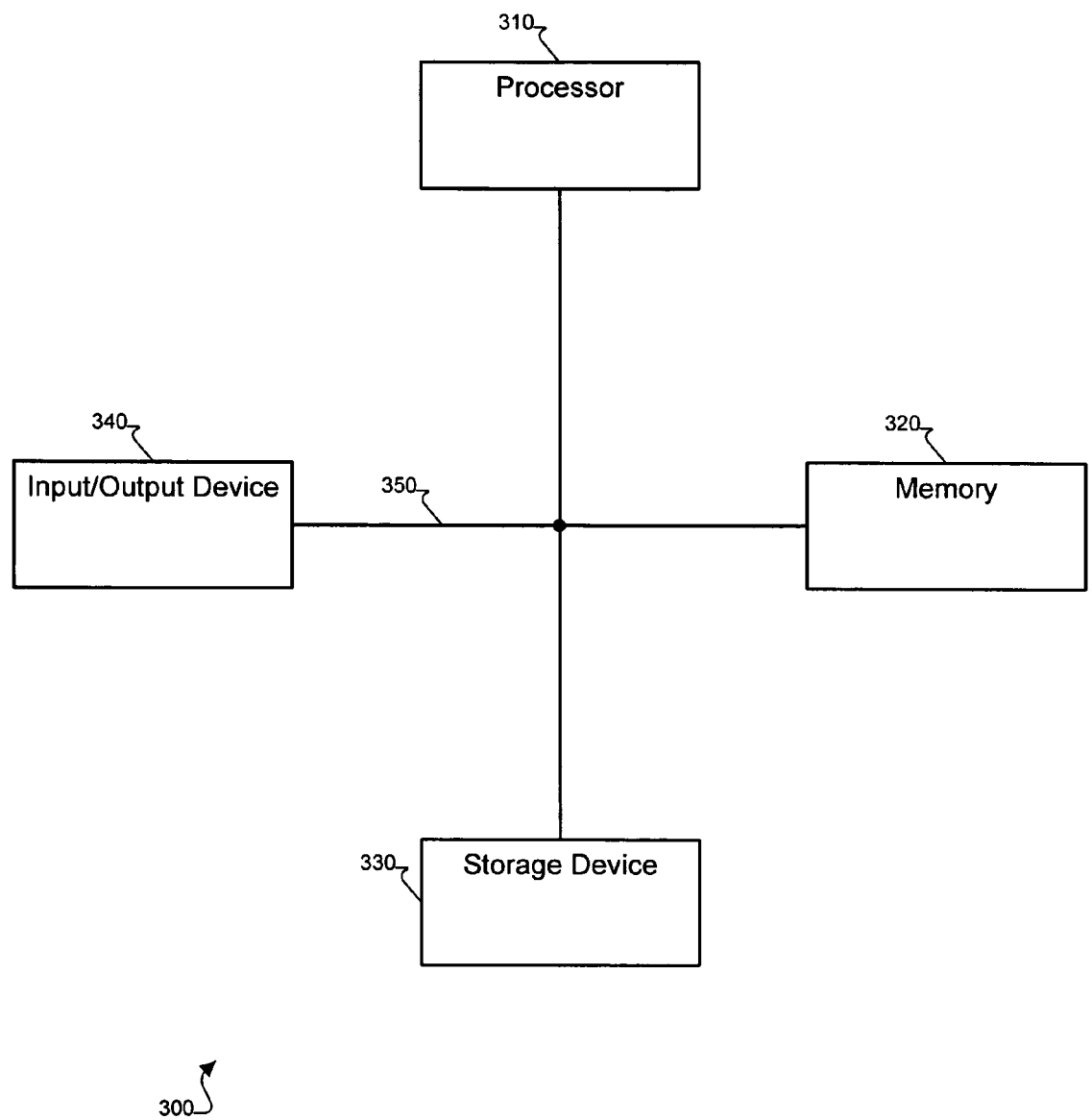
FIG. 3 is a block diagram of a general computer system.

FIG. 3 is a block diagram of a computer system 300 that can be used in the operations described above, for example in any of the computer device 202, the administration system 218 or the user system(s) 210. The system 300 includes a processor 310, a memory 320, a storage device 330 and an input/output device 340. Each of the components 310, 320, 330 and 340 are interconnected using a system bus 350. The processor 310 is capable of processing instructions for execution within the system 300. In one embodiment, the processor 310 is a single-threaded processor. In another embodiment, the processor 310 is a multi-threaded processor. The processor 310 is capable of processing instructions stored in the memory 320 or on the storage device 330 to display graphical information for a user interface on the input/output device 340.

The memory 320 stores information within the system 300. In one embodiment, the memory 320 is a computer-readable medium. In one embodiment, the memory 320 is a volatile memory unit. In another embodiment, the memory 320 is a non-volatile memory unit.

The storage device 330 is capable of providing mass storage for the system 300. In one embodiment, the storage device 330 is a computer-readable medium. In various different embodiments, the storage device 330 may be a floppy disk device, a hard disk device, an optical disk device, or a tape device.

The input/output device 340 provides input/output operations for the system 300. In one embodiment, the input/output device 340 includes a keyboard and/or pointing device. In one embodiment, the input/output device 340 includes a display unit for displaying graphical user interfaces. For example, the input/output device can generate any or all GUIs described herein.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer program product to be used in administrating user access to data, the computer program product being tangibly embodied in a machine-readable storage device and comprising:
    rules establishing authorizations to data in a computer system, each of the rules to authorize a subject to perform an action on data; and
    an activation function usable by an administrator to selectively indicate whether at least one of the rules is to be applied against a user seeking to perform an action on any of the data,
    wherein the activation function is to use a first type of graphical indication to graphically indicate that an attribute associated with a first rule cannot be evaluated, and to use a second type of graphical indication to graphically indicate that the first rule will be applied against the user in a case that the attribute can be evaluated, and
    wherein the activation function is to use a third type of graphical indication to graphically indicate that an attribute associated with a second rule can be evaluated, and to use a fourth type of graphical indication to graphically indicate that the second rule will be applied against the user.

2. The computer program product of claim 1, wherein the activation function is displayed in a graphical user interface generated by the computer program product.

3. The computer program product of claim 1, wherein the rules are grouped in at least one work center software module that can be assigned to one or more users.

4. The computer program product of claim 3, wherein the work center software module is proposed for assignment to the one or more users based on a role of the one or more users.

5. The computer program product of claim 3, wherein the work center software module provides general authorization to perform a plurality of actions.

6. The computer program product of claim 5, wherein the rules are configured to limit the general authorization provided by the work center software module.

7. The computer program product of claim 6, wherein if the attribute associated with the first rule is not specified in the computer system, the first rule does not limit a general authorization to perform an action associated with the first rule.

8. The computer program product of claim 1, included in the computer system upon delivery to a customer.

9. The computer program product of claim 8, wherein the subjects are to be specified by the customer.

10. A computer program product tangibly embodied in a machine-readable storage device, the computer program product comprising instructions that, when executed, generate on a display device a graphical user interface (GUI) for administrating user access to data, the GUI comprising:
    first items to indicate rules for establishing authorizations to data in a computer system, each of the rules authorizing a user to perform an action on an object;
    a first type of graphical indication to graphically indicate, for a first rule indicated as to be applied against the user, that an attribute associated with the first rule cannot be evaluated;

a second type of graphical indication to graphically indicate that the first rule will be applied against the user in a case that the attribute can be evaluated;

a third type of graphical indication to graphically indicate that an attribute associated with a second rule can be evaluated; and a fourth type of graphical indication to graphically indicate that the second rule will be applied against the user.

11. The computer program product of claim 10, wherein the first items are grouped in association with a work center software module that can be assigned to one or more users.

12. The computer program product of claim 11, wherein an administrator may activate at least one of the rules to limit a general authorization provided by the work center software module.

13. The computer program product of claim 12, wherein the GUI provides status information indicating whether the attribute associated with the first rule has been specified in the computer system.

14. A system comprising:
a computer device comprising:
  a repository storing information instances; and
  an authorization and access management module including rules establishing authorizations to the information instances and user IDs defining subjects, each of the rules to authorize a subject to perform an action on an information instance; and an administration system in communication with the computer device to display an administration graphical user interface to selectively indicate whether at least one of the rules is to be applied against a subject seeking to perform an action on any of the information instances, wherein the administration system is to use a first type of graphical indication to graphically indicate that an attribute associated with the first rule cannot be evaluated, and to use a second type of graphical indication to graphically indicate that the first rule will be applied against the subject in a case that the attribute can be evaluated, and wherein the administration system is to use a third type of graphical indication to graphically indicate that an attribute associated with a second rule can be evaluated, and to use a fourth type of graphical indication to graphically indicate that the second rule will be applied against the subject.

15. A system according to claim 14, wherein if the attribute associated with the first rule is not specified in the computer device, the first rule does not limit a general authorization to perform an action associated with the first rule.

16. A system according to claim 14, wherein the graphical user interface is to provide status information indicating whether the attribute associated with the first rule is specified in the computer device.

* * * * *